Nov. 28, 1961  B. R. ADELMAN  3,010,354
ROCKET GRAIN AND METHOD FOR RESTRICTING SAME
Filed Aug. 15, 1955  3 Sheets-Sheet 1

INVENTOR.
B. R. ADELMAN
BY Hudson & Young
ATTORNEYS

Nov. 28, 1961  B. R. ADELMAN  3,010,354
ROCKET GRAIN AND METHOD FOR RESTRICTING SAME
Filed Aug. 15, 1955  3 Sheets-Sheet 2
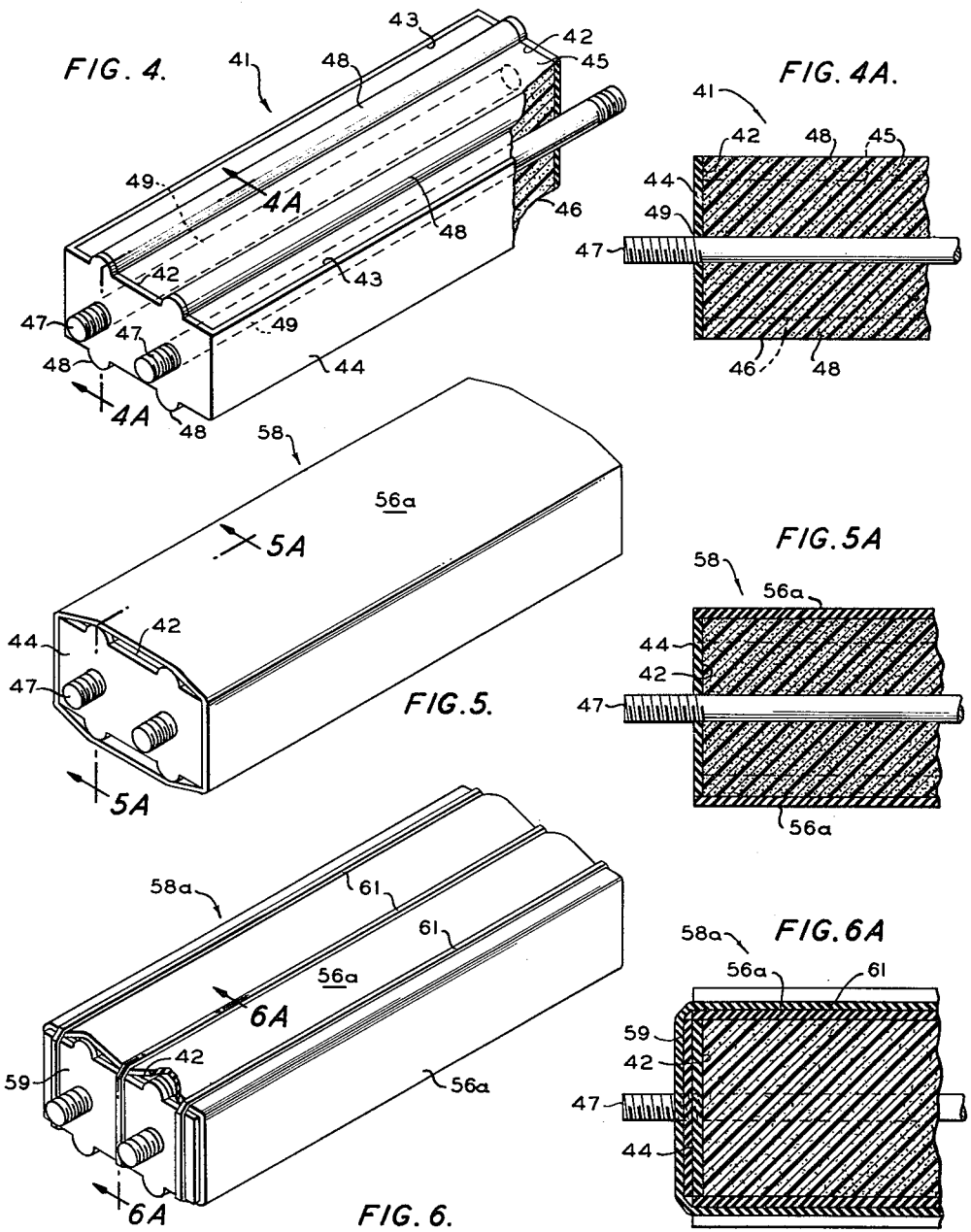
INVENTOR.
B. R. ADELMAN
BY Hudson & Young
ATTORNEYS Nov. 28, 1961   B. R. ADELMAN   3,010,354
ROCKET GRAIN AND METHOD FOR RESTRICTING SAME
Filed Aug. 15, 1955   3 Sheets-Sheet 3

INVENTOR.
B. R. ADELMAN
BY Hudson & Young
ATTORNEYS

United States Patent Office 3,010,354
Patented Nov. 28, 1961

3,010,354
ROCKET GRAIN AND METHOD FOR RESTRICTING SAME
Barnet R. Adelman, Waco, Tex., assignor to Phillips Petroleum Company, a corporation of Delaware
Filed Aug. 15, 1955, Ser. No. 528,156
6 Claims. (Cl. 86—1)

This invention relates to a solid rocket grain of the restricted burning type for use in large rocket motors, especially the booster type. In one aspect it relates to a method for restricting the burning surface of a rocket grain. In some aspects the present invention may be regarded as an improvement of a rocket grain having a double web thickness as shown and claimed in the copending U.S. application, Serial No. 453,772, now Patent No. 2,939,396, filed September 2, 1954, by Barnet R. Adelman.

In the operation of rocket motors, the burning of a solid rocket grain produces large volumes of gas under high pressure. This gas is exhausted through the nozzle of the rocket motor at a high velocity whereby a propulsive thrust is produced. It is essential that the burning of a rocket grain proceed at a controlled and constant rate on only certain specified surfaces of the charge in order that the desired propulsive thrust can be maintained for a predetermined period of time. In rocket motors of the booster type, this period of time is usually a matter of seconds, which means that a very large quantity of propellant material, for example 2000 to 6000 pounds, must be wholly consumed during this short period of time. In order to prevent the rocket grain from burning on those surfaces where combustion is not desired, it is necessary to restrict or inhibit the burning of these surfaces, as is well known in the art. When the burning of the rocket grain proceeds only on its unrestricted or exposed surfaces, the operating pressure and the shape of the pressure-time curve may be controlled.

Any deviation of the burning surface from the desired value often leads to inefficient operation of the rocket motor; if this deviation is substantial and positive, excessive pressures may develop and lead to inefficient operation of the rocket motor. Such variations in the burning surfaces are often caused by separation of the restricting material from the rocket grain during storage, handling, or firing. If the restricting material employed is not perfectly bonded to the rocket grain, uncontrolled or irregular burning will occur on those surfaces exposed by this undesirable separation. Various coating or restricting materials have been employed or proposed in the past and these materials are applied to the rocket grain by methods such as hot-rolling, cold-rolling, stress relief, hot-molding, potting, dipping, brushing, spraying, and the like. However, many of these methods result in restricted rocket grains that are susceptible to uncontrolled burning due to the imperfect bond between the rocket grain and the restricting material.

I now propose a novel method for applying restrictor material to a rocket grain by which an intimate bond is effected between the two surfaces and there is provided thereby a rocket grain which will impart a controlled thrust to a rocket motor in which such rocket grains are utilized as fuel. Essentially, this novel method involves the application of an elastic means to the outside of a rocket grain which has been coated or covered with uncured rubbery restrictor material, whereby an intimate bond is effected between the grain and restrictor material after the combination so produced is cured.

Accordingly, it is an object of this invention to provide a solid rocket grain having improved burning characteristics.

Another object is to provide a novel method and apparatus for applying restrictor material to a rocket grain.

A further object is to provide a method whereby the deleterious effect of burning down the sides of the rocket grain between the grain and restricting material is obviated.

Other objects and advantages of this invention will become apparent to those skilled in the art upon reading the following disclosure and discussion.

The foregoing and other features of my invention will be better understood from the following detailed description and appended claims taken in conjunction with the accompanying drawings in which:

FIGURES 4, 5 and 6 are isometric views of a rocket grain of the double web type at various stages of restriction with corresponding views shown in cross-section in FIGURES 4A, 5A, and 6A taken along the lines indicated;

The essence of my novel method of restricting rocket grains is in first applying a layer or coating of uncured restricting material to those surfaces of the rocket grain to be restricted, insertion of the combination so formed into an expanded elastic tube which can be made of cured rubber, fabric reinforced or impregnated with cured or uncured rubbery restrictor material, contraction of the tube about the grain, and curing of the restricted grain with the tube contracted about the restricted grain. In another embodiment of my invention, patches of restricting material are applied to the end surfaces of the grain and cured under the force of weights, metal or rubber-like bands, or elastic wrappings about the restricted end surfaces. In another embodiment of my invention, elastic wrappings, which can be made of cured rubber, fabric reinforced or impregnated with cured or uncured rubbery restrictor material, are wound about an uncured restricted rocket grain and the combination then cured.

Figure 1:
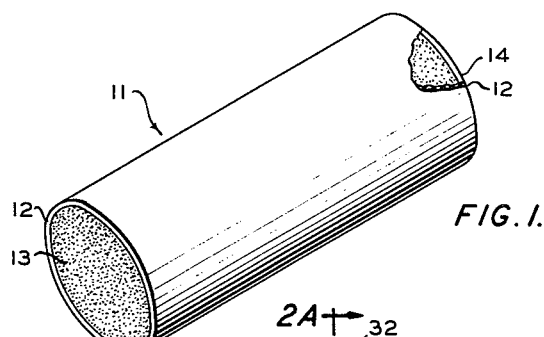
FIGURE 1 is an isometric view of a cylindrical rocket grain of the end burning type.

Referring to the drawings now in detail, and to FIGURE 1 in particular, cylindrical rocket grain 11 is shown substantially as it would appear after extrusion in the uncured state with a layer of uncured restricting material 12 applied to its sides with one of its ends 13 exposed or unrestricted. An end type of burning is initiated on this latter surface and proceeds down the length of grain toward the opposite end 14 which is restricted. The grain 11 can be provided with an axial perforation (not shown). The progressive burning of such a perforated grain would then initially taken place in the perforation rather than on exposed surface 13.

Figure 2:
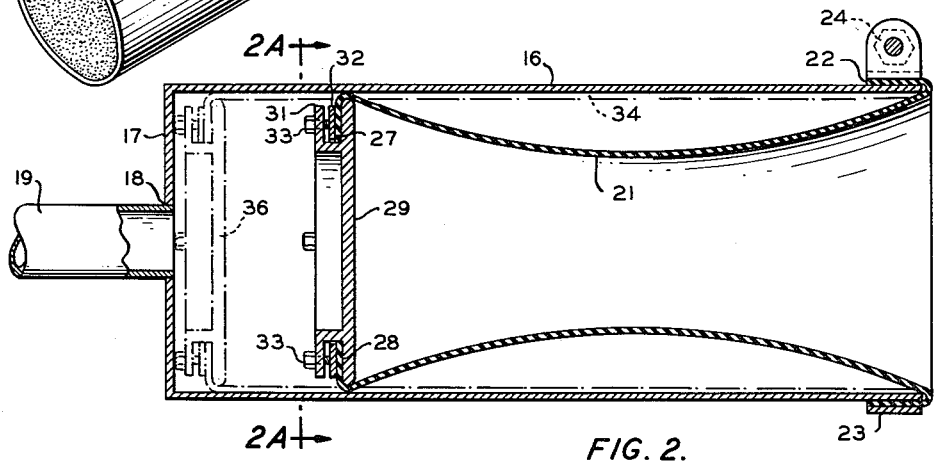
FIGURE 2 is a cross-sectional view of a restricting cylinder.
Figures 2A, 3:
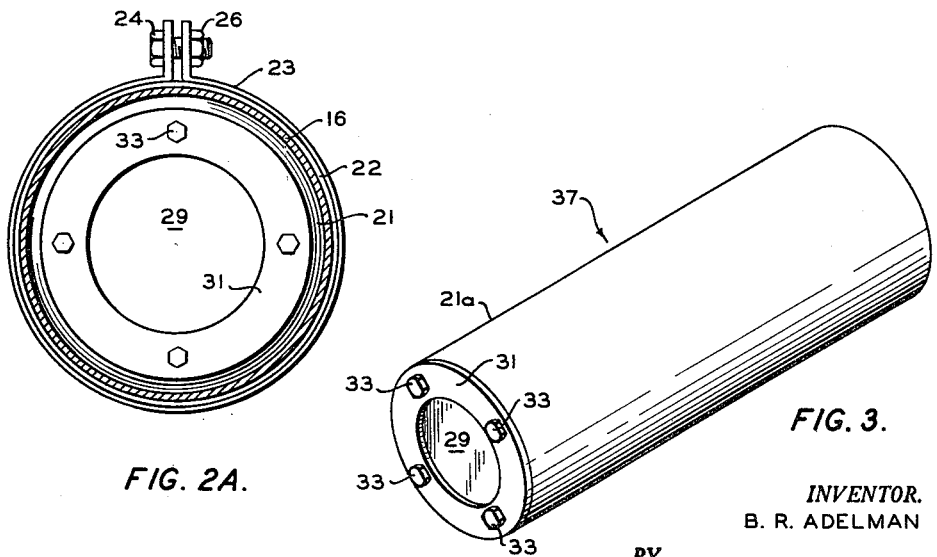
FIGURE 2A is a cross-sectional view taken along the line 2A—2A of FIGURE 2.
FIGURE 3 is an isometric view of a cylindrical rocket grain restricted in accordance with the instant invention.

The restricting chamber 16 shown in FIGURE 2 is of circular cross-section and closed end 17 has an opening 18 to permit evacuation of the chamber 16 by any suitable means, such as a vacuum pump, not shown, through conduit 19. An elastic tube 21 is inserted within the restricting chamber 16 and one of its ends 22 is circumferentially secured at its outer periphery to the outside wall of one end of the restricting chamber 16 by a split ring or clamp 23 having a bolt 24 and nut 26, shown more clearly in FIGURE 2A. Chamber 16 may be provided with a clamp integral with the chamber wall in place of the removable split ring shown in FIGURE 2. The other end 27 of tube 21 is circumferentially fitted at its periphery in the peripherial annular recess 28 of a circuit plate 29 defined by annular flange 31 and split washer 32. Washer 32 is interposed between the peripheral end 27 of tube 21 and annular flange 31 and this end 27 of tube 21 is secured to plate 29 by tightening screws 33. The diameter of plate 29 is somewhat smaller than the inner diameter of chamber 16 so that it may freely move laterally within the latter when chamber 16 is evacuated. Upon evacuation, the tube 21 is stretched to the shape shown by broken line 34 and plate 29 is caused to move laterally towards chamber end 17 and occupy the position shown by the broken line 36.

While the rocket grain 11 of FIGURE 1 is shown already provided with a layer of restricting material 12 prior to insertion into the tube 21 of FIGURE 2, it is within the scope of this invention to apply the restricting material by coating the inner wall of tube 21, FIGURE 2, by spraying or similar application of the restricting material thereto while the tube 21 is held expanded, and then insert the unrestricted grain therein.

After evacuation of chamber 16, rocket grain 11 is inserted into the expanded tube 21 and the latter is allowed to contract by re-establishing the pressure in chamber 16. Bolt 24 and nut 26 are then loosened and split ring 23 removed allowing withdrawal of the rocket grain 37, FIGURE 3, with the tube 21a tightly encasing the restricted rocket grain 37. This rocket grain 37 is then ready for curing during which both the restrictor 12 and propellant material are simultaneously cured and an intimate bond affected between the two. If the tube 21 is impregnated or reinforced with uncured rubber or uncured rubbery restrictor material, this material will also be cured along with the restricted rocket grain 37. After curing, the tube 21a may be removed from the rocket grain 37. To aid the ease of this removal, it is within the scope of this invention to preliminarily apply a coating of suitable mold releasing material (such as Dri-Film, a silicone resin manufactured by General Electric or the D.C. Mold Release Emulsion No. 35 manufactured by Dow Corning Corp.) prior to insertion of the restricted grain 11 in the expanded tube 21. In some types of rocket motors it may be desirable to insert the rocket grain 37 directly into the rocket motor casing without removal of the tube 21a or plate 29. Therefore, it is within the scope of this invention to apply a coating of adhesive or cement to the outside of the tube 21a so as to effectively bond the rocket grain 37 to the rocket motor case. A particularly suitable material for this purpose is disclosed in a copending U.S. application, Serial No. 506,658, now Patent No. 2,898,315, filed May 6, 1955, by Robert L. Hall et al. Alternatively, the restricted rocket grain 37 can be bonded by means of resilient strips of sponge rubber, for example, to the case. In this latter method the exceedingly large stresses imposed on a complete bond between all of the rubber tube 21a and the case surfaces when the rocket motor is subjected to temperature cycles during tests, storage, or firing, is substantially obviated.

The restricted slab-type rocket grain 41 shown in FIGURE 4 is representative of that shown and claimed in the copending U.S. application, Serial No. 453,772, filed September 2, 1954, by Barnet R. Adelman. This rocket grain 41 has a rectangular parallelepiped configuration with its ends 42 and sides 43 covered by burning restricting material 44 while its upper surface 45 and lower surface 46 are exposed or unrestricted. Rocket grain 41 is shown provided with internal support rods 47 and has ribs 48 the total surface area of which is equal to or slightly greater than the surface area of the perforation 49 provided for the internal support rods 47. As shown in FIGURES 4 and 4A, this rocket grain 41 and its layers of restricting material 44 appear as they would in the uncured state.

Figure 7:
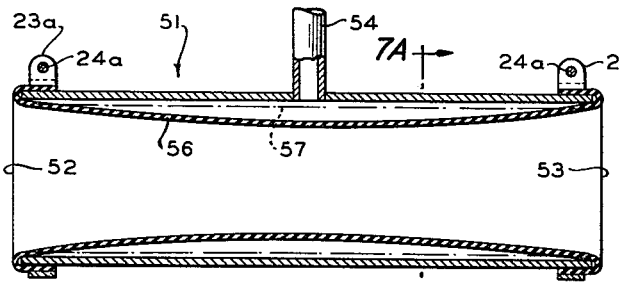
FIGURE 7 is a cross-sectional view of a second embodiment of a restricting chamber.
Figure 7A:
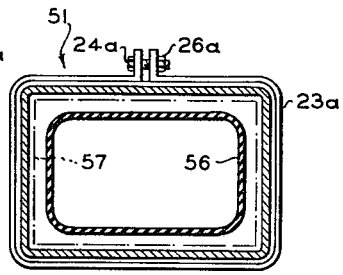
FIGURE 7A is a cross-sectional view taken along the line 7A—7A of FIGURE 7.

The restricting chamber shown in FIGURES 7 and 7A and generally designated as 51, is rectangular in cross-section and adapted to aid in the restricting of that type of rocket grain 41 shown in FIGURE 4. Both ends 52 and 53 of this chamber 51 are open and it is provided with an evacuation conduit 54 similar to that described in the discussion of FIGURE 2. Passing through both ends 52 and 53 of the chamber 51 is an elastic tube 56 which is secured to the outer side of chamber 51 at its periphery by split rings or clamps 23a with bolts 24a and nuts 25a similar to that shown in FIGURE 2. The split ring 23a may be made of spring steel or similar flexible material. Rocket grain 41, FIGURE 4, is inserted in tube 56 subsequent to the expansion of the latter to the position shown by broken line 57 by reason of the evacuation of chamber 51. Tube 56 is then allowed to contract by reestablishment of pressure in chamber 51 and after removal of split rings 23a, the rocket grain 58 is removed from the chamber 51 and appears with its contracted tube 56a at this stage substantially as shown in FIGURES 5 and 5A. End plates 59 made of metal or any other suitable material, FIGURES 6 and 6A, are fitted over the restricted ends 42 of rocket grain 58a and held rigidly thereto by bands 61. Bands 61 can be made of rubberlike material, metal, or similar means, which will hold plates 59 fast to the restricting material applied to the ends 42. In place of bands 61, it is within the scope of this invention to simply apply a weight or similar means to plates 59. This rocket grain 58a and its restricting layers 44 are then ready for curing, the ends 42 and sides 43 thus being rigidly held in intimate contact with the restricting layers 44 during the curing which effects an intimate bond between the two. After curing, bands 61, end plates 59, and tube 56a are removed and the cured restricted rocket grain is ready for assembly in a rocket motor.

Figure 8:
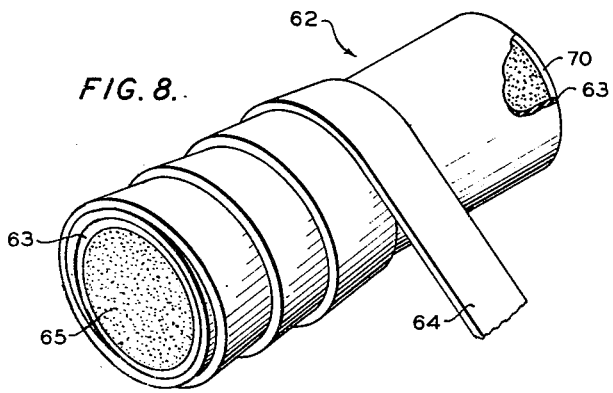
FIGURE 8 is an isometric view of a cylindrical rocket grain illustrating another embodiment of my method of restriction.

Referring to FIGURE 8 now, a further embodiment of my invention is illustrated. A cylindrical rocket grain 62 of the end burning type is restricted on its sides and end 70 with a layer of restricting material 63 while end 65 is unrestricted or exposed and it is this surface upon which burning is initiated. (Rocket grain 62 can likewise be provided with a central perforation (not shown) similar to that of FIGURE 1.) Prior to curing the propellant material and restricting material 63, rocket grain 62 is wound with elastic wrapping or tape 64. Tape 64 can be made of cured or uncured rubber or rubber-like material or can be made of fabric impregnated with cured or uncured rubber or restricting material. The weave of the fabric should be such that the fabric when impregnated or reinforced with rubbery material will be extensible and resilient. In some instances it may be desirable to apply a suitable adhesive to the layer of restricting material 63 prior to wrapping with the elastic tape 64 in order to more effectively hold the tape 64 to the restricting material 63 while wrapping. After curing the rocket grain, the elastic wrapping 64 can be removed or, alternatively, the rocket grain 62 can be directly inserted into the rocket motor casing, in a manner similar to that set forth in regard to FIGURE 3.

Figure 9:
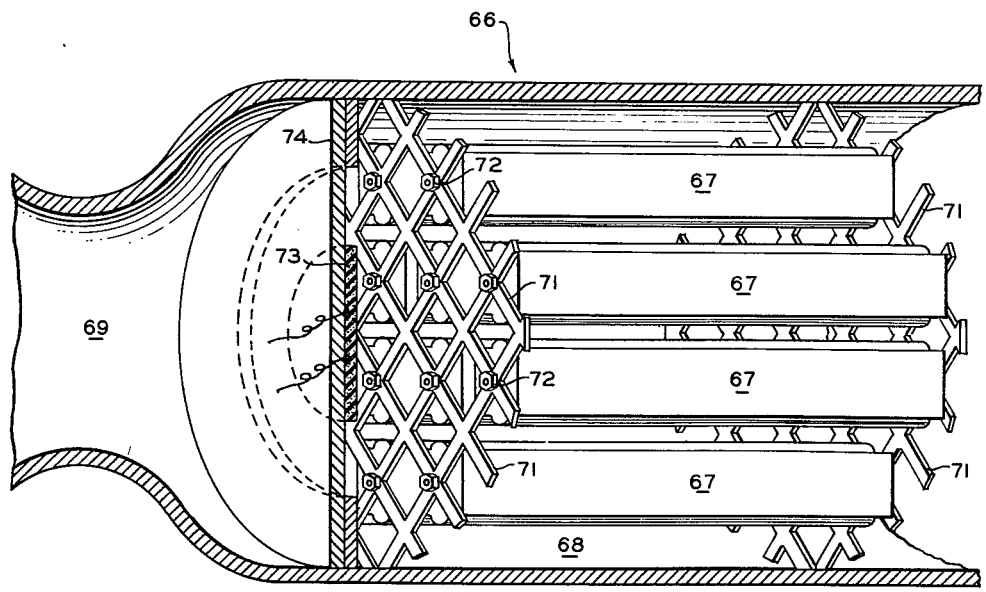
FIGURE 9 is a view shown partly in cross-section of a rocket motor having assembled within it a plurality of rocket grains restricted in accordance with the practice of my invention.

A plurality of rocket grains, such as shown in FIGURE 4, can be assembled in a frame and mounted in a rocket motor combustion chamber in spaced relation with one another. FIGURE 9 shows a rocket motor 66 in partial cross-section provided with a plurality of rocket grains 67 restricted in accordance with the practice of this invention. The rear end of the cylindrical combustion chamber 68 is shaped to define a nozzle or venturi having a throat 69 for the discharge of combustion gas at a high velocity. Obviously a separate nozzle portion could be substituted for the integral construction shown. The rocket grains 67 are supported in a rocket grain frame comprising a support grid made of crossing bars 71. The threaded ends of the rod-like supporting members extend through holes at the intersection of bars 71 and are secured thereto by nuts 72. The firing of the rocket motor 66 may be initiated by the ignition of the rocket grains 67 by any conventional means, such as an electrically initiated igniter 73 mounted within chamber 68 adjacent to a blowout type sealing disk 74 which is provided across the forward end of the nozzle. Where the propellant consists of several sections or bundles of rocket grains, additional igniters may be inserted between the sections and at the end and head of the chamber 68 as required.

The rocket grains restricted in accordance with the practice of this invention will have improved burning characteristics. Irregular burning between the restricting material and the adjacent surfaces of the grain is thus obviated. As a result the burning of the rocket grain will be strictly confined to the exposed or unrestricted surfaces with little likelihood for burning to occur on the restricted surfaces due to parting of the restricting material from the grain.

The rocket grains which can be utilized in the practice of this invention can be prepared from several known propellant materials. The following is a typical formulation for the preparation of propellant material and it is to be understood that it is set forth for illustrative purposes only and does not unduly limit the invention.

|  | Parts per 100 parts of rubber | Parts weight percent |
|---|---|---|
| Binder | | 17.5 |
| Butadiene/methylvinylpyridine (90/10) | 100 | |
| Carbon black | 10-30 | |
| TP-90B [1] | 10-30 | |
| Flexamine [2] | 0-5 | |
| Aerosol-OT [3] | 0-2 | |
| Sulfur | 0.2 | |
| SA-113 [4] | 0.2 | |
| Zinc oxide | 0.5 | |
| Oxidizer | | 82.5 |
| Ammonium nitrate 70.1-78.4 | | |
| Ammonium perchlorate 4.1-12.4 | | |
| Catalyst: Milori blue [5] | | 1.0-2.0 |

[1] Dibutyl carbitol formal.
[2] A physical mixture containing 65% of a complex diarylamineketone reaction product and 35% of N,N'-diphenyl-p-phenylenediamine.
[3] Dioctyl ester of sodium sulfosuccinic acid.
[4] N,N-dimethyl-S-tertiary butyl sulfenyl dithiocarbamate.
[5] A pigment similar to Prussian blue but a red tint, prepared by the oxidation of a paste of potassium ferrocyanide and ferrous sulfate.

The above solid rocket grains will ordinarily be of such configuration so as to conform in size and shape to the particular rocket motor combustion chambers in which they are to be employed and it will be apparent that the practice of the present invention is not limited to any particular shape or size of rocket grain, although the rocket grains disclosed and claimed in the copending U.S. application, Serial No. 453,772, filed September 2, 1954, by Barnet R. Adelman, may be advantageously restricted by the practice of this invention. These grains can be extruded, molded or cast from a molten condition in a mold and subsequently solidified by cooling. After solidifying, the uncured restricting material can be applied to the non-burning surfaces by any of the conventional methods such as dipping, spraying, brushing, coating, covering, or by applying the uncured restricting material to the inside of the expanded tube of this invention prior to insertion of the grain therein. In the practice of this invention, the grain is cured at the same time the applied restricting material is cured. The restricting materials to be applied to the grain are those which are capable of readily bonding to the surface of the grain, and, depending upon the particular restricting material to be applied, certain rubber or plastic cements may be employed to effect a more intimate bonding. In general, among the requirements for restricting materials for solid rocket grains are: (1) the restrictor must form a substantially perfect bond to the grain; (2) the restrictor must have physical properties at least equal to those of the propellant; (3) the restrictor must not melt or burn readily under conditions extant in the rocket motor chamber during firing; (4) the restrictor must maintain good mechanical properties and flexibility at extremes of temperature; (5) the restricting material must be relatively inexpensive and have good availability; and (6) it must be possible to apply the restrictor in an economical manner for production operations.

In the practice of this invention the restricting materials to be employed are those which are resilient after being cured, such as synthetic rubbers containing no oxidizer and prepared by the polymerization or copolymerization of conjugated dienes, either alone or with copolymerizable monomers. Although the practice of this invention is not to be unnecessarily limited to any specific restrictor compositions, suitable synthetic rubber compositions having the following recipes are set forth for illustrative purposes.

*GR–S restrictor recipe*

|  | Parts per 100 parts of rubber |
|---|---|
| GR–S 1505 [1] | 100 |
| Carbon black (Philblack A) | 50 |
| Zinc oxide | 3 |
| Sulfur | 1.5 |
| Flexamine [2] | 1.5 |
| Stearic acid | 1.5 |
| Pentaryl A [3] | 10 |
| Wood rosin | 5 |
| Butyl eight [4] | 3.5 |

[1] 90/10 butadiene/styrene.
[2] A physical mixture containing 65% of a complex diarylamineketone reaction product and 35% of N,N'-diphenyl-p-phenylenediamine.
[3] Amylbiphenyl.
[4] Dithiocarbamate-type rubber accelerator.

*Butadiene/methylvinylpyridine restrictor recipes*

Recipe I:
|  | Parts per 100 parts of rubber |
|---|---|
| Butadiene/methylvinylpyridine (90/10) | 100 |
| Carbon black (Philblack A) | 60 |
| Zinc oxide | 3 |
| Dibutylphthalate | 50 |
| Wood rosin | 5 |
| Chloranil | 3 |

| Recipe II | Parts per 100 parts of rubber | |
|---|---|---|
| Butadiene/methylvinylpyridine | 100 | 100 |
| Carbon black (Philblack A) | 20 | 40 |
| Epichlorohydrin | 8 | |
| Sulfur | 2 | 1.75 |
| Zinc oxide | 6 | 3.0 |
| Flexamine [2] | | 1.5 |
| Wood rosin | | 5 |
| Liquid polypentadiene | 100 | 10 |
| Dibutylphthalate | | 5 |
| Butyl eight [4] | 6 | 3 |
| Ammonium carbonate | 5 | 7.5 |

[2],[4] See footnotes above.

Since many possible variations and modifications may be made of this invention by those skilled in the art without departing from the scope thereof, it is to be understood that all matter herein set forth in the discussion and drawings is merely illustrative and do not unduly limit the invention.

I claim:

1. A method of restricting a solid rocket grain which comprises, in combination, the steps of applying uncured rubbery restricting material to those surfaces of an uncured solid rocket grain to be restricted, said grain fabricated from composite propellant comprising a major amount of a solid inorganic oxidizing agent and a minor amount of a rubbery binder, compressing said uncured restricting material into contact with said uncured solid rocket grain by application of pressure, and curing the combination formed while maintaining said pressure so as to effect an intimate bond between the resulting cured restricting material and cured rocket grain.

2. A method of restricting a solid rocket grain which comprises, in combination, the steps of applying a coating of uncured rubbery restricting material to those surfaces of an uncured solid rocket grain to be restricted, said grain fabricated from composite propellant comprising a major amount of a solid inorganic oxidizing agent and a minor amount of a rubbery binder, inserting the combination formed into an expanded elastic tube, allowing said tube to contract about said combination, and curing said uncured rubbery restricting material and said uncured rocket grain while under compression of said tube to effect an intimate bond between the resulting cured restricting material and cured rocket grain.

3. The method according to claim 2 further comprising the step of removing said tube after curing.

4. A method of restricting a solid cylindrical rocket grain which comprises, in combination, the steps of applying a coating of uncured rubbery restricting material to those surfaces of an uncured solid rocket grain to be restricted, said grain fabricated from composite propellant comprising a major amount of a solid inorganic oxidizing agent and a minor amount of a rubbery binder, tightly winding about said grain a fabric impregnated with uncured rubbery material to compress said restricting material into contact with said uncured solid rocket grain, curing the combination so formed to effect an intimate bond between the resulting cured restricting material, cured rocket grain, and cured fabric.

5. A method of restricting a solid rocket grain of rectangular parallelepiped configuration which comprises, in combination, the steps of applying a coating of uncured rubbery restricting material to those surfaces of an uncured solid rocket grain to be restricted, said grain fabricated from composite propellant comprising a major amount of a solid inorganic oxidizing agent and a minor amount of a rubbery binder, inserting the combination formed lengthwise into an expanded elastic tube, allowing said tube to contract about said combination, placing end plates over the restricted ends of said grain, placing elastic bands rectangular around said combination to hold said end plates in contact with said restricted ends, and curing said uncured rubbery restricting material and said uncured rocket grain while under compression of said tube and said bands to effect an intimate bond between the resulting cured restricting material and cured rocket grain.

6. The method according to claim 5 further comprising the step of removing said tube and said elastic bands after curing.

References Cited in the file of this patent

UNITED STATES PATENTS

| 1,074,809 | Newton | Oct. 7, 1913 |
|---|---|---|
| 2,101,015 | Anderson | Dec. 7, 1937 |
| 2,417,090 | Silk et al. | Mar. 11, 1947 |
| 2,643,611 | Ball | June 30, 1953 |
| 2,706,309 | Lampman | Apr. 19, 1955 |
| 2,780,996 | Hirsch et al. | Feb. 12, 1957 |
| 2,813,487 | Miller et al. | Nov. 19, 1957 |

FOREIGN PATENTS

| 26,430 | Great Britain | of 1907 |
|---|---|---|
| 655,585 | Great Britain | July 25, 1951 |